United States Patent
Ter Beek et al.

(10) Patent No.: US 7,258,767 B2
(45) Date of Patent: Aug. 21, 2007

(54) SOLAR DEW TUBE

(75) Inventors: Arnoldus Paulus Maria Ter Beek, Gorssel (NL); Carel Theo Jozef Wreesmann, Zeist (NL)

(73) Assignee: Akzo Nobel N.V., Arnhem (NL)

( * ) Notice: Subject to any disclaimer, the term of this patent is extended or adjusted under 35 U.S.C. 154(b) by 473 days.

(21) Appl. No.: 10/181,33

(22) PCT Filed: Jan. 12, 2001

(86) PCT No.: PCT/EP01/00421

§ 371 (c)(1),
(2), (4) Date: Sep. 23, 2002

(87) PCT Pub. No.: WO01/53211

PCT Pub. Date: Jul. 26, 2001

(65) Prior Publication Data

US 2003/0092876 A1    May 15, 2003

(30) Foreign Application Priority Data

May 17, 2000   (EP) ................................ 00200167

(51) Int. Cl.
*B01D 5/00* (2006.01)
*C02F 1/04* (2006.01)

(52) U.S. Cl. ......... 203/10; 159/DIG. 15; 159/DIG. 27; 159/DIG. 28; 202/187; 202/267.1; 203/86; 203/100; 210/641; 210/500.23; 210/500.38

(58) Field of Classification Search .................. 203/10, 203/86, 100; 202/267.1, 185.1, 182, 187; 159/DIG. 27, DIG. 28, DIG. 15; 210/641, 210/500.23, 500.38
See application file for complete search history.

(56) References Cited

U.S. PATENT DOCUMENTS 4,125,963 A   11/1978   Johnson .......................... 47/27

(Continued)

FOREIGN PATENT DOCUMENTS

DE    195 22 239 A1    1/1997

(Continued)

OTHER PUBLICATIONS

Derwent Abstract No. 010152978, abstracting FR 2 707 281 A1.

(Continued)

*Primary Examiner*—Virginia Manoharan
(74) *Attorney, Agent, or Firm*—TraskBritt

(57) ABSTRACT

The invention pertains to a device for the condensation of water from an aqueous liquid by using a temperature gradient, which device includes:
(a) a vapor chamber that can be brought in contact with a condensation compartment wherein at least part of the water vapor from the aqueous liquid condenses, and wherein inside of said vapor chamber is located
(b) an evaporation compartment having a least a wall with an outer surface and which includes a closed, hollow and water permeable membrane wherein the vapor chamber has an outer surface that includes a substantially water-impermeable insulation skirt with an inner and an outer surface, such that there is a gap between the inner surface of the insulation skirt and the outer surface of the evaporation compartment, and wherein the vapor chamber has a lower surface of an active width (w) which is at least 10% of the effective diameter (d) of the evaporation compartment.

The invention further pertains to a device and to the use of said device for the irrigation of plants, salt leaching, recovery of fresh water, purification of water by membrane distillation, and/or concentrating waste water.

19 Claims, 9 Drawing Sheets

U.S. PATENT DOCUMENTS

| | | | | |
|---|---|---|---|---|
| 4,187,151 | A | * | 2/1980 | Hanning .................. 202/185.3 |
| 4,219,387 | A | * | 8/1980 | Gruntman ................... 202/182 |
| 4,545,862 | A | * | 10/1985 | Gore et al. ................... 203/10 |
| 4,698,135 | A | | 10/1987 | Raab .......................... 202/234 |
| 4,959,127 | A | * | 9/1990 | Michna ...................... 202/177 |
| 5,067,272 | A | | 11/1991 | Constantz ...................... 47/27 |
| 5,595,662 | A | * | 1/1997 | Sanderson .................. 202/234 |
| 5,989,697 | A | | 11/1999 | Gebben ................... 428/315.5 |
| 6,440,275 | B1 | | 8/2002 | Domen ....................... 202/234 |
| 6,484,439 | B1 | * | 11/2002 | Tonkin et al. ............... 47/48.5 |
| 6,679,991 | B1 | * | 1/2004 | Van Andel ............... 210/321.6 |

FOREIGN PATENT DOCUMENTS

| | | |
|---|---|---|
| EP | 761 715 A1 | 3/1997 |
| FR | 2 707 281 A1 | 1/1995 |
| GB | 1 541 283 | 2/1979 |
| WO | 95/24260 * | 9/1995 |
| WO | WO98/16474 | 4/1998 |
| WO | WO 00/28807 | 5/2000 |

OTHER PUBLICATIONS

Derwent Abstract No. 011110118, abstracting DE 195 22 239 A1.

International Search Report No. PCT/EP 01/00421 dated Aug. 3, 2001.

* cited by examiner a)

b)

c)

d)

SOLAR DEW TUBE

The present application is a national phase filing of PCT International Patent Application No. PCT/EP01/00421, filed on Jan. 12, 2001, which claims priority from European Patent Application No. 00200167.5, filed on Jan. 17, 2000.

The present invention relates to a device for the condensation of water vapor by means of a supporting material. More in particular, the invention refers to a device enabling the evaporation of water from a waste-containing aqueous liquid and the condensation of the resulting water vapor by means of a temperature gradient between this aqueous liquid and a supporting material. The present invention further refers to the use of said device for the irrigation of plants, for salt leaching of salinated soils, for the recovery of fresh water, purification of contaminated water, dewatering of water-contaminated liquids, and/or for the concentrating waste water.

In many parts of the world drip irrigation has become a widely accepted technique in agriculture. The main reason for its success is its ability to give off almost equal amounts of water at the drip points irrespective of the minor differences in elevation which occur almost invariably in virtually every landscape. However, use has to be made of the fresh water which is actually present, e.g., in aquifers, to feed the drip irrigation system. This usually results in these fresh water resources becoming increasingly saline over time, which is not only an environmental problem but may lead to a fresh water shortage in entire regions.

Another approach is to start from waste-containing aqueous liquids, such as sea water, to remove the waste from these aqueous liquids, and to use the resulting fresh water for plant irrigation. This removal can, e.g., be achieved by reverse osmosis. However, the drawbacks of this technique are rather complicated operation and maintenance.

Another well-known device for the production of fresh water from a waste-containing aqueous liquid is the solar still as, e.g., described in *Solar Energy Engineering*, A. A. M. Sayigh (ed.), New York 1977. Saline water is led into shallow basins, from which evaporation takes place driven by solar energy and the resulting water vapor is condensed. However, this system can only be operated on level surfaces, as otherwise the waste-containing aqueous liquid contained in the basins will flow over the edge of the basin and spoil the plant supporting material. Therefore, the applicability of these devices is restricted to completely level areas.

A further device which enables the evaporation of water from waste-containing aqueous liquids and the condensation of the resulting water vapor is known, e.g., from U.S. Pat. No. 4,698,135. One embodiment disclosed in this reference is an irrigation device which is made of a water vapor impermeable sheet in the form of an arch and divided into an upper and a lower compartment by a water permeable sheet.

As the entire upper surface of the aqueous liquid-containing upper compartment is in direct contact with its surroundings, a substantial part of the solar energy absorbed by the aqueous liquid is lost to these surroundings. It is therefore an object of the present invention to reduce this loss of heat energy. The design of this device is quite sophisticated and susceptible to damage. It is a further object of the present invention to provide a device which has a more robust and simple design.

Another embodiment disclosed in U.S. Pat. No. 4,698,135 is an irrigation device comprising a tubular condensation compartment and a tubular evaporation compartment. For effective condensation, the wall of the condensation compartment must have a temperature significantly lower than the temperature of the aqueous liquid contained in the evaporation compartment. At least in regions with high ambient temperature such a temperature gradient cannot be achieved with such a device. To ensure effective condensation of water vapor the walls of the condensation compartment are provided with external cooling devices containing water as cooling medium. It is therefore another object of the present invention to provide a device which enables efficient condensation of evaporated water without making the construction of an external cooling system necessary.

In FR 2,707,281 a device is disclosed which comprises a condensation compartment The condensation compartment is partly located underground. The part which is located underground contains small openings to enable the release of condensed water into the ground. The evaporation efficiency of this device is quite low. This device makes it necessary to dig holes in the ground, resulting in a quite expensive construction. It is therefore a further object of the present invention to provide a device which can be operated above ground with high efficiency. WO 98/16474 discloses as a less preferred embodiment an irrigation device which comprises hydrophilic material soaked with salt water and heated by the sun. The resulting water vapor is blown out of the pipe by means of a ventilator. As devices for use in agriculture generally are some tens to hundreds of meters long, the removal of the salt-enriched aqueous liquid is a problem which makes the application of such a device rather disadvantageous.

Finally, non-prepublished international patent application PCT/EP99/08159 describes an irrigation device formed by an evaporation compartment comprising an upper sheet which is capable of absorbing sunlight and a lower sheet which comprises an aqueous liquid impermeable and water permeable membrane and which sheets form a cavity to be filled with sea water. The irrigation device is provided on a plant supporting material and condensation occurs directly on the plant supporting material.

It has now been found that all the above objectives can be met by a device (1) for the condensation of water from an aqueous liquid by means of a temperature gradient, which device comprises (a) a vapor chamber (5) that can be brought in contact with a condensation compartment (4) wherein at least part of the water vapor from the aqueous liquid condenses, and wherein inside of said vapor chamber is located (b) an evaporation compartment (2) having a least a wall with an outer surface and comprising a closed, hollow water permeable membrane, and which vapor chamber has an outer surface that comprises a substantially water-impermeable insulation skirt (3) with an inner and an outer surface, such that there is a gap between the inner surface of the insulation skirt and the outer surface of the evaporation compartment, and wherein the vapor chamber has a lower surface of an active width (w) which is at least 10% of the effective diameter (d) of the evaporation compartment.

The crux of the invention resides, int. al., in the fact that when the device is in operation there is a temperature gradient between an aqueous liquid and a condensation compartment, which can be a supporting material, and the surface of such a supporting material below the vapor chamber will have a significantly lower temperature than the upper part of the irrigation system and in particular the aqueous liquid contained in the evaporation compartment. Due to the resulting vertical temperature gradient, condensation occurs in the lower part of the device and above all in the condensation compartment, such as on the surface of the supporting material. In this way water is distilled by using a membrane, a process which is generally referred to as membrane distillation. Thus, it has surprisingly been found that a highly efficient condensation is possible without any external cooling device being necessary. It is stressed that the term "lower surface" in this invention means the surface that is not directed to the heat source. The term "upper surface" means the surface that is directed to the heat source.

In the device of the present invention the vertical temperature gradient is realized, int. al., by the following means:

(i) the evaporation compartment is located inside the vapor chamber, such that there is a gap between the inner surface of the insulation skirt and the outer surface of the evaporation compartment. Due to the presence of this gap, any loss of heat energy absorbed, e.g., in the form of solar energy, by the aqueous liquid contained in the evaporation compartment is prevented or at least reduced. In this way it is possible to heat the water to sufficiently high temperatures, such as above 60° C. and preferably above 70° C. to obtain an efficient membrane distillation process. Instead of one evaporation compartment, also two or more evaporation compartments can be used. The term "evaporation compartment" as used in this invention thus means one or a multitude of evaporation compartments;

(ii) due to the fact that the vapor chamber is in contact with or connected to the condensation compartment, for instance when the lower surface of the vapor chamber is the supporting material and/or a material which stands in liquid flow and vapor flow communication with said supporting material. In this way the condensation compartment is wetted by condensing water. When the condensation compartment is the supporting materials, due to the high temperature conductivity and heat capacity of wet supporting material (in contrast to dry supporting material), and the relatively high mass of the supporting material that is involved in the device, thermal energy is effectively led away from the surface of the supporting material. This results in a sufficiently low temperature of the surface of the supporting material.

Apart from the high heat capacity and heat conductivity of the supporting material, the day-night sequence, which preferably is present when the device is in use, further increases the temperature gradient: during the night, thermal energy that has been absorbed by the supporting material below the insulation skirt during the day is lost to the surroundings. Thus the day-night sequence allows permanent and durable use of the device.

It is noted that if either of the above conditions (i) and (ii) is not met, the temperature gradient will not always be sufficiently high to enable efficient evaporation and condensation as described below.

If, e.g., a substantial part of the surface of the device stands in direct contact with the surroundings, as is the case in the device of FIGS. 1 and 2 of U.S. Pat. No. 4,698,135, a substantial part of the solar energy absorbed by the aqueous liquid contained in the evaporation compartment is lost to the surroundings and the temperature gradient is reduced to an unacceptably low level.

Further, if, e.g., the lower surface of the vapor chamber is a liquid impermeable material and, consequently, the vapor chamber is not in liquid flow and vapor flow communication with the condensation compartment below the vapor chamber, as is the case in WO 98/16474, the supporting material will not be wetted by condensing water and any heat will not be led away from the surface of the supporting material effectively.

Furthermore, if the surface of the supporting material is not available for the condensation of water vapor, as is the case in e.g. FIGS. 3-5 of U.S. Pat. No. 4,698,135, efficient condensation of water vapor is not possible. However, effective use of the lower temperature of the supporting material can only be made if the effective width of the lower surface of the vapor chamber is above a certain value, relative to the effective diameter of the evaporation compartment. The terms "effective diameter" and "active width" are explained in the chapter "Characterization methods/Definitions".

The membrane that is suitable for the present invention is water permeable and preferably salt resistant. Salt can be transported through the membrane as long as it is dissolved in water. Further, it is noted that the outer surface of the membrane is in contact with air. When the membrane is salt resistant, this means that the membrane polymer does not degrade under the influence of warm aqueous salt solutions. More preferably, the membrane is a homogeneous non-porous hydrophilic membrane.

The condensation compartment can be a vessel, container, basin, or the like, but more preferably, the condensation compartment is formed by a material such as a supporting material, for instance, supporting material such as natural or artificial soil, which stands in both liquid flow and vapor flow communication with the vapor chamber. Particularly when the condensation compartment is natural or artificial soil contained in a vessel or the like, it is advantageous when the vapor chamber comprises means for obtaining a convection stream to enhance the evaporation from the evaporation compartment and/or the transport of the water vapor from the vapor chamber to the condensation compartment, such as a ventilator, fan, and the like. If so desired such vessel may be filled with natural or artificial soil.

It has also surprisingly been found that a sufficiently high temperature gradient can be obtained without it being necessary to locate part of the vapor chamber underground. On the contrary, the device of the present invention can be located completely on the top surface of a supporting material. In other words, it is preferred that the lower surface of the vapor chamber is the top surface of the supporting material and/or a material which stands in liquid flow and vapor flow communication with said top surface of the supporting material. In this case, the digging of holes as is necessary for the device of FR 2,707,281 is not necessary to construct the device of the present invention.

Further, sophisticated sealing techniques as are necessary for the device of FIGS. 1 and 2 of U.S. Pat. No. 4,698,135 can be dispensed with in the device of the present invention.

Finally, as the evaporation compartment comprises a water permeable membrane, very simple designs of the evaporation compartment are possible. More in particular, the entire evaporation compartment can be made of this water permeable membrane, and the use of any partly open pipes with anti-overflow floats as are used in FR 2,707,281 or the combination of a water vapor and aqueous liquid impermeable pipe with a hydrophilic material as is applied in WO 98/16474 can be dispensed with.

Furthermore, if the evaporation compartment is made entirely of a water permeable homogeneous non-porous hydrophilic material, the entire surface of the evaporation compartment will allow water vapor to evaporate, leading to a very high evaporation efficiency such that the device is suitable for purification of water by membrane distillation.

Finally, the application of the device of the present invention is not restricted to level areas but can be applied irrespective of the elevation of the surface, i.e., it can be tapplied in flat as well as mountainous regions.

Figure 1:
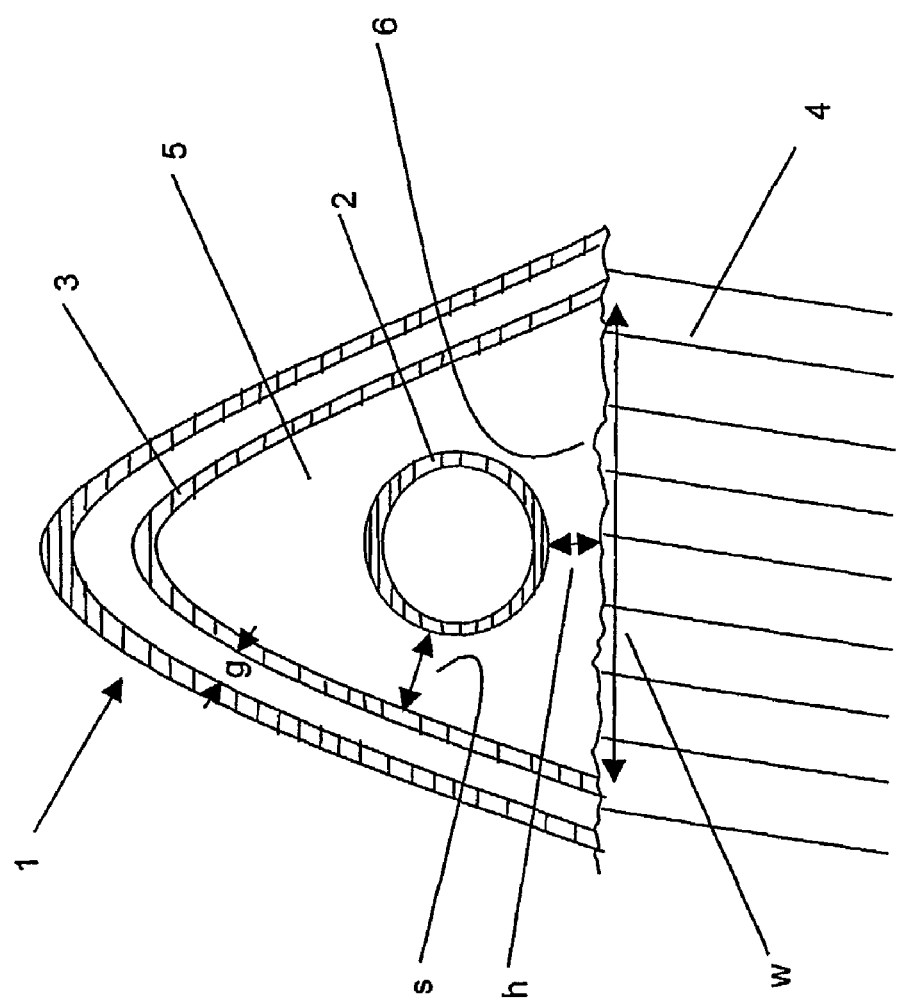
FIGS. 1, 2a, and 2b show cross-sections of several preferred embodiments of the device of the present invention.

The invention will be described in more detail below:

DEVICE OF THE PRESENT INVENTION

The present invention refers to a device (1) for the condensation of water by means of a temperature gradient between an aqueous liquid and a condensation compartment (4). In a preferred embodiment the device comprises means for filling the evaporation compartment with the aqueous liquid, and optionally, means for letting out the residue of the aqueous liquid that is obtained after evaporation of the water and transport of the water vapor from the evaporation compartment to the vapor chamber and the condensation compartment. In another preferred embodiment the evaporation compartment is a seamlessly closed hollow membrane.

As stated above, it is preferred to the device of the present invention that the lower surface of the vapor chamber is the surface of a supporting material below the vapor chamber and/or another material which stands in liquid flow and vapor flow communication with said supporting material (i.e. the supporting material and optionally the other material form the condensation compartment). Due to the lower temperature of the surface of the supporting material below the vapor chamber, a substantial part of the water vapor will condense on said surface. This of course does not exclude that a small part of the water vapor contained in the vapor chamber will condense on the inner surface of the insulation skirt of the vapor chamber. However, for a good performance of the device it is preferred that at least 25% of the water condenses in the condensation compartment. More preferably, more than 50%, and most preferably, more than 75% of the water condenses in the condensation compartment.

Due to the fact that the lower surface of the vapor chamber can be the supporting material and/or a material which stands in liquid flow and vapor flow communication with said supporting material, the vapor chamber stands in liquid flow and vapor flow communication with said supporting material. Thus a major part of the water vapor contained in the vapor chamber will condense on the supporting material. Further, any water vapor condensing on the inner surface of the insulation skirt will flow along said inner surface and enter the supporting material. Consequently, the supporting material is automatically wetted when the device is in operation. As in particular wet supporting material has a high heat capacity, any heat will be effectively led away from the surface of the supporting material. In this way it is possible with the device of the present invention to realize extremely high temperature gradients between the upper part of the device and in particular the aqueous liquid contained in the evaporation compartment and the surface of the supporting material.

As stated above, the supporting material may be covered with a further material. However, in this case care must be taken that this further material is liquid permeable and vapor permeable, as otherwise the vapor chamber will not be in liquid flow and vapor flow communication with the supporting material anymore. Liquid permeable in the sense of the present invention means that water flows essentially freely through this material. More specifically, the water permeability of this material generally is such that at a pressure of 0.001 MPa, the water flow through the material is at least 1 $l/(m^2*s)$, preferably at least 10 $l(m^2*s)$, more preferably at least 50 $l/(m^2*s)$, even more preferably at least 100 $l/(m^2*s)$, and most preferably at least 200 $l/(m^2*s)$. Generally, if the material is liquid permeable, it automatically is also vapor permeable.

On the basis of the above, it will be clear that it would not be suitable to cover the entire surface of the supporting material with a water vapor impermeable material as is the case in WO 98/16474, as thus the supporting material below the insulation skirt cannot be wetted and a sufficiently high temperature gradient cannot be realized.

A suitable material with which the supporting material might be covered is a root cloth, which prevents roots or plants entering the device of the present invention.

The heat transfer can be further increased by using a supporting material which by itself (i.e., already in the dry state) has a high heat capacity and thermal conductivity. More in particular, it is preferred that the supporting material has a heat capacity of at least 0.5 $kJ/(kg*°C.)$ and preferably of at least 0.8 $kJ/(kg*°C.)$. Suitable supporting materials comprise, e.g., any conventional plant supporting materials, such as natural soil, e.g., sand, clay or mixtures thereof, with clay being preferred, or artificial soil, such as substrate materials known from soilless culture or hydroponics, and hydrophilic porous materials, for example Oasis™. The supporting material can also be in the form of a mat. In a preferred embodiment the natural or artificial soil contains a drainage system which enables the collection of condensed water.

As has already been stated above, preferably the lower surface of the vapor chamber is the top surface of the supporting material and/or a material which is in liquid flow and vapor flow communication with said top surface of the supporting material. In this way the digging of holes, as is necessary for the system described in FR 2,707,281, can be avoided.

As further explained above, for effective condensation of water vapor it is essential that the active width (w) of the lower surface of the vapor chamber is at least 10% of the effective diameter of the evaporation compartment. Preferably, it is at least 20%, more preferably at least 30%, still more preferably at least 40%, even more preferably at least 50%, and most preferably at least 100% of the effective diameter (d) of the evaporation compartment and preferably less than 200% of the effective diameter (d) of the evaporation compartment. If the active width of the lower surface of the vapor chamber is below 10%, the surface that is available for condensation is too small in relation to the surface that allows evaporation of water. In this case effective condensation of water is not possible.

Preferably, the evaporation compartment has an effective diameter (d) in the range of 2-20 cm, more preferably 6-12 cm. It is further preferred that the active width (w) of the lower surface of the vapor chamber is in the range of 4-60 cm. The effective diameter and the active width preferably do not exceed the given upper limits in order not to cover too much surface of the supporting material with the device and to keep the amount of material needed for the device at a minimum. Further, at too large dimensions, the device may become mechanically unstable.

As explained above, a further key aspect of the device of the present invention is that the evaporation compartment is located inside the vapor chamber, such that there is a gap between the inner surface of the insulation skirt and the outer surface of the evaporation compartment. Due to the presence of this gap, the inner surface of the insulation skirt does not or predominantly not touch the outer surface of the evaporation compartment. More in particular, preferably less than 30%, more preferably less than 20%, even more preferably less than 10%, and most preferably less than 5% of the inner surface of the insulation skirt is in touch with the outer surface of the evaporation compartment. Still more preferably, the outer surface of the evaporation compartment does not touch the inner surface of the insulation skirt at all. In these cases any loss of heat absorbed by the aqueous liquid contained in the evaporation compartment to the surroundings is at least considerably reduced or even completely avoided.

The average shortest width (s) of the gap preferably is at least 0.1 cm and more preferably 0.1-5 cm and most preferably 0.1-2 cm. The "average shortest width (s)" is the shortest distance between the inner surface of the insulation skirt and the outer surface of the evaporation compartment averaged over the length (L) of the device. A major part and preferably substantially the entire gap comprises water vapor and a gas such as air. However, to ensure that the outer surface of the evaporation compartment does not touch the inner surface of the insulation skirt, the gap may additionally contain a spacer. The spacer can, e.g., be selected from materials such as Enkamat™ (ex Akzo Nobel/Acordis) or blister padding. It is noted that a blister padding can be used as insulation skirt and spacer material at the same time: the blister padding preferably is arranged such that its nodes point towards the evaporation compartment. The water vapor as well as aqueous liquid impermeable outer surface of the blister padding can then function as insulation skirt, while the nodes contained in the inner surface will function as spacer between the insulation skirt and the evaporation compartment. Another preferred aspect of the invention is the seamlessly closed hollow evaporation compartment (2) having walls with an inner and an outer surface, that comprises a salt resistant and, more preferably, also a water permeable homogeneous hydrophilic membrane. Such salt resistant evaporation compartments are novel. The term "salt resistant" means that the polymer of the membrane does not degrade under the influence of warm salt water.

The insulation skirt may be of any suitable material. Examples of materials that can be used for at least partially insulating the vapor chamber are polymeric materials, metal, ceramic materials, glass or other transparent materials. The upper surface of the insulation skirt may comprise and preferably consists essentially of a material that is transparent to visual light and that is opaque to other wavelengths. The insulation skirt must be impermeable to both an aqueous liquid and to water vapor. Although in practice often not necessary, to further reduce the radiation of heat energy out of the aqueous liquid contained in the evaporation compartment, the insulation skirt preferably comprises at least two aqueous liquid and water vapor impermeable sheets defining a gap having an average width (g) in the range of at least 0.1 cm, more preferably 0.1-5 cm, and most preferably 0.1-2 cm (see FIG. 1). The gap preferably contains a gas, such as air, and optionally a spacer.

Preferably less than 30%, more preferably less than 20%, even more preferably less than 10%, and most preferably less than 5% of the inner surface of the outer sheet of the insulation skirt is in touch with the outer surface of the inner sheet of the insulation skirt. Still more preferably, the sheets of the insulation skirt do not touch each other at all. This can be ensured by using a spacer, which is preferably selected from materials such as Enkamat™ or blister padding. The blister padding preferably is again arranged such that the nodes point towards the evaporation compartment.

Suitable materials of which the insulation skirt may be composed are, e.g., glass or polymers, such as polyolefins, e.g., polyethylene, polypropylene, polyvinylchloride, polyesters, polycarbonate, such as Lexan™, PMMA such as Plexiglas™ or Perspex™. These materials will be referred to as "insulation materials".

Preferably, the insulation skirt comprises two sheets with a spacer between these sheets and a second spacer between the inner surface of the inner sheet and the outer surface of the evaporation compartment.

If the device is to be operated by exposing it to sunlight, any insulation material comprised in the insulation skirt, any spacer between individual sheets of the insulation skirt, and any spacer between the insulation skirt and the evaporation compartment are preferably translucent to the solar radiation which heats the aqueous liquid contained in the evaporation compartment, meaning that at least 80% and preferably at least 90% of this solar radiation can reach the evaporation compartment and will lead to a temperature increase for the aqueous liquid contained therein. Further, it is preferred that any insulation material comprised in the insulation skirt, any spacer between individual sheets of the insulation skirt, and any spacer between the insulation skirt and the evaporation compartment are sufficiently chemically stable to the solar radiation which heats the aqueous liquid contained in the evaporation compartment. The insulation skirt can additionally comprise a material which is translucent to any solar radiation heating up the aqueous liquid contained in the evaporation compartment but which is not translucent to UV light.

In another embodiment the condensation compartment is externally cooled, preferably by water, sea water, air, or soil.

Though most of the water vapor condenses in the condensation compartment, such as on the surface of the supporting material, it cannot be entirely excluded that a small part of the water vapor will condense on the inner surface of the insulation skirt. If this happens on the part of the inner surface of the insulation skirt which faces the outer surface of the evaporation compartment, condensed water may drip onto this outer surface of the evaporation compartment, depending on the shape of the insulation skirt. As a consequence, the evaporation efficiency of the evaporation compartment would be reduced.

It is therefore desirable that the shape of the insulation skirt is chosen in such a way that essentially no water that has condensed on the inner surface of the insulation skirt will drip back onto the outer surface of the evaporation compartment. This can be realized by choosing an inner surface of the insulation skirt shaped in such a way that any water condensed on the inner surface is led along this surface onto the surface of the supporting material.

Figure 6:
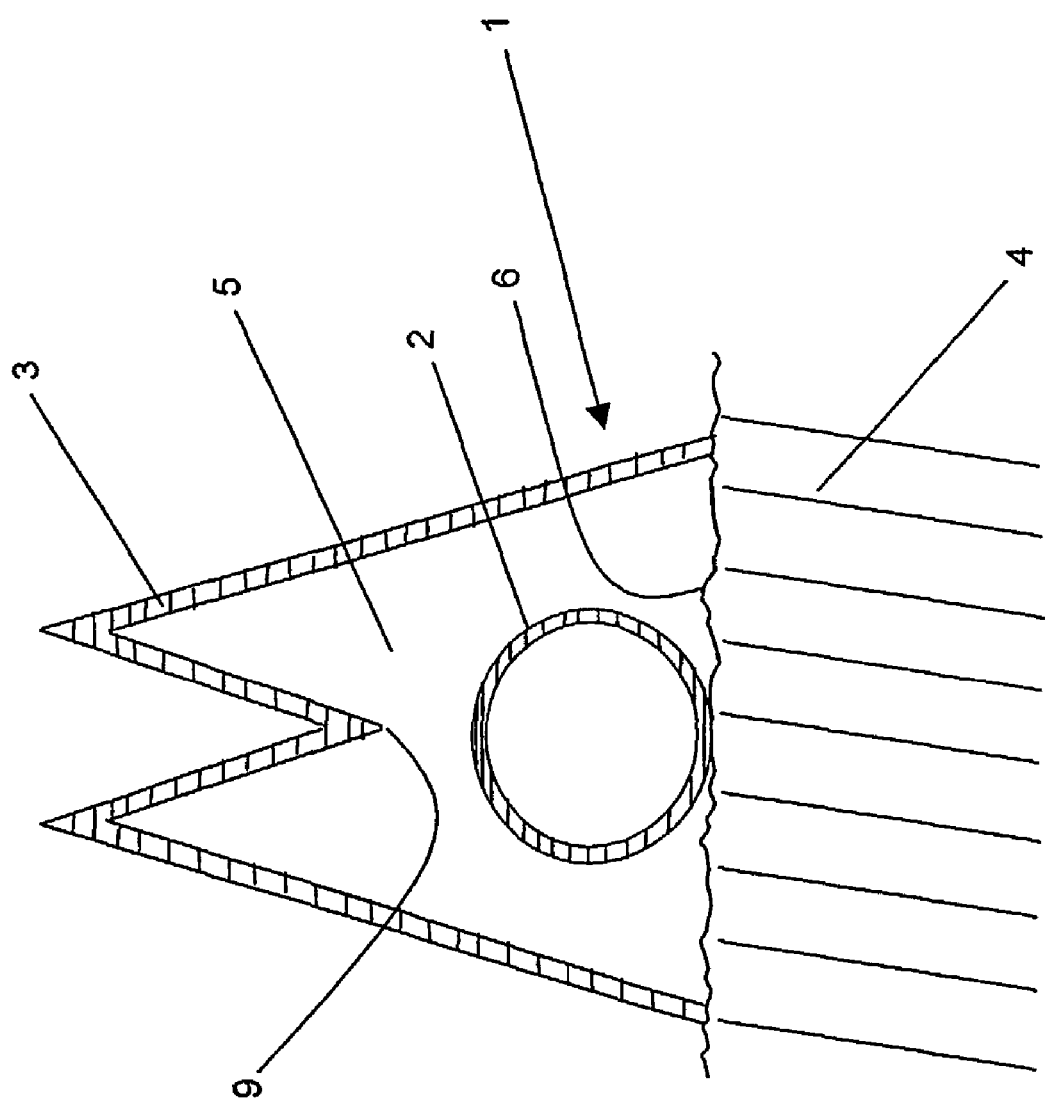
FIG. 6 shows a less preferred insulation skirt geometry.

An inner surface as shown in FIG. 6 is therefore less preferred, as condensed water can collect at point 9 and drip onto the outer surface of the evaporation compartment. Also less preferred is an inner surface where the part of the inner surface which faces the outer surface of the evaporation compartment comprises a horizontal cross-section. However, it is noted that an inner surface of the insulation skirt which in part contains a horizontal cross-section may still be preferred, as long as this horizontal part of the inner surface does not face the outer surface of the evaporation compartment.

Figure 2A:
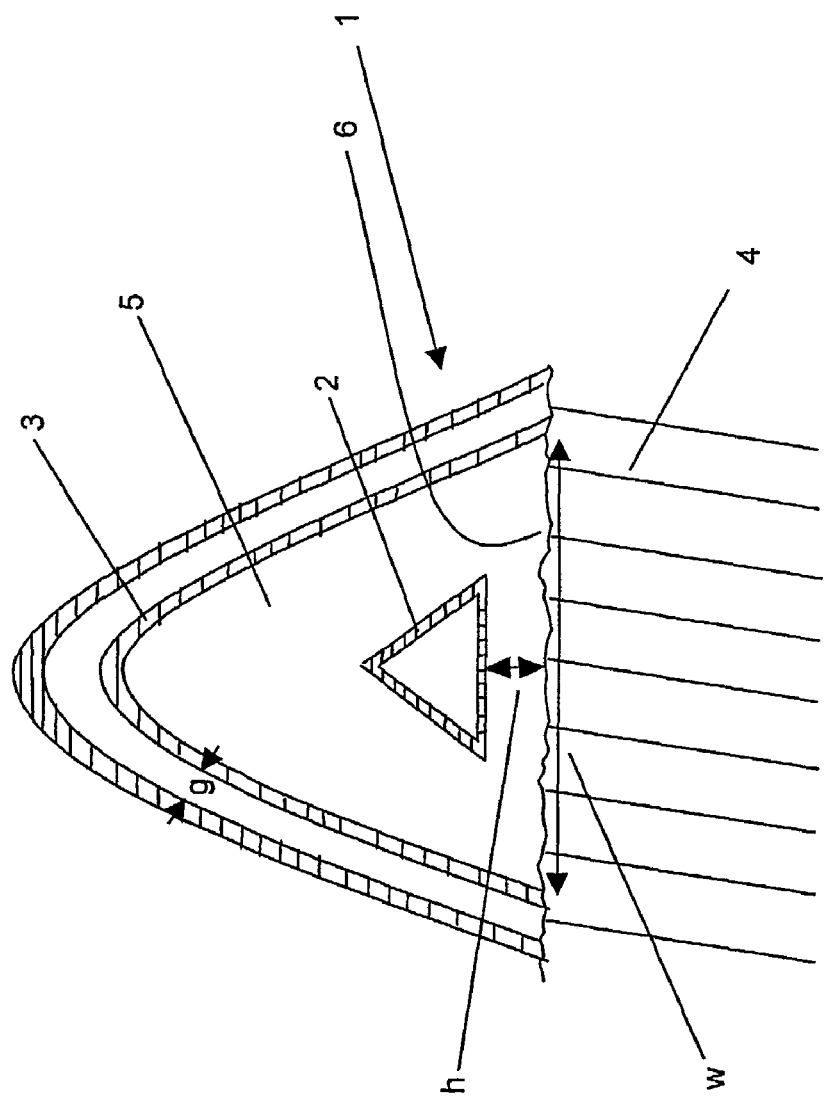

In a preferred embodiment of the invention, the cross-section of the insulation skirt located vertically above the evaporation compartment has the form of an arch as shown, for instance, in FIGS. 1 and 2a.

Any water vapor which can leave the vapor chamber to the surroundings is lost, as it will not condense on the surface of the supporting material anymore. Therefore, the vapor chamber preferably is constructed in such a way as to prevent any loss of water vapor to the surroundings. More in particular, the water vapor impermeable insulation skirt preferably is sealed to the supporting material to prevent the loss of water vapor from the vapor chamber. It is, e.g., possible to bury the edges of the insulation skirt in the supporting material or to place, e.g., stones, iron bars or sand on the outer edges of the insulation skirt.

The walls of the evaporation compartment comprise an aqueous liquid impermeable and water permeable membrane. "Aqueous liquid impermeable" in the sense of the present invention means that the material does not have any macroscopic openings through which an aqueous liquid contained in the evaporation compartment can flow freely out of the evaporation compartment and into the vapor chamber. Preferably, the aqueous liquid impermeable and water permeable membrane comprises and most preferably consists essentially of a hydrophilic and non-porous membrane, such as a membrane made of a copolyetheramide, a copolyetherurethane, or a copolyetherester. Most preferably, the membrane comprises and most preferably consists essentially of a copolyetheramide. In the most preferred copolyetheramide, the polyether and polyamide sequences are linked via amide bridges. Such a polymer is described in detail in non-prepublished international patent application PCT/EP99/08159. Preferably, the membrane has a water vapor permeability of at least 500 g/(24 h*m$^2$). The water vapor permeability is measured on a membrane with a thickness of 15 µm, as described in ASTM E96-66 (Method B, modified (water temperature: 30° C., ambient temperature: 21° C. at 60% relative humidity)). The membrane preferably has a thickness of 10 to 200 µm and most preferably of 20 to 100 µm. In a preferred embodiment the membrane material is provided with carbon black to enhance the required temperature gradient.

The walls of the evaporation compartment preferably consist essentially of the above described membrane. However, it is also possible that one part of the walls comprises the above membrane and another part comprises another aqueous liquid impermeable as well as water vapor impermeable polymer.

Preferably, a copolyether amide obtainable from the polymerization of a lactam monomer having 3 to 12 carbon atoms, a dicarboxylic acid with 2 to 20 carbon atoms, and a diamine of the formula $H_2N-(CRH)_y-(OQ)_x-NH_2$, wherein R is independently H or $CH_3$, x is an integer from 1 to 100, y is an integer from 1 to 20, Q is $R^2-R^1$ wherein $R^2$ is a C2-C4 alkylene group substituted by $R^1$, which is hydrogen or an C1-C4 alkyl group, and, is used for the salt resistant and water permeable homogeneous hydrophilic membrane. Particularly useful is a copolyether amide obtainable from the polymerization of e-caprolactam, adipic acid, and a mixture of poly(ethylene oxide) and poly(propylene oxide) both containing 2-aminopropyl terminated groups and having a molecular weight of about 2000. Such materials are known in the art. Reference is made to European patent application EP 0,761,715 that describes the synthesis of these materials.

Further, the evaporation compartment may comprise a reinforcing material. This can be located inside the evaporation compartment or on the outer surface of the compartment. The reinforcing material preferably does not reduce the amount of evaporated water. Suitable reinforcing materials are therefore porous materials, such as fabrics, braids, or (non)wovens of polyethylene, polypropylene, polyester, polyamide, or combinations thereof, such as Colback™ (ex Akzo Nobel/Acordis). If the reinforcing material is located on the outer surface of the evaporation compartment, the reinforcing material preferably is not translucent to solar radiation in order to protect the membrane of the evaporation compartment from sunlight and in particular UV radiation. More in particular, it is preferred that the reinforcing material has a sunlight-absorbent structure, more preferably it has a dark color, and most preferably it is black. In this way, in the reinforcing material, the sunlight is converted into heat which heats up the aqueous liquid contained in the evaporation compartment.

Figure 5:
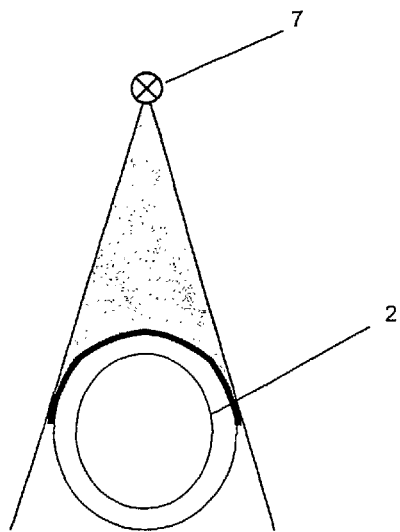
FIG. 5 illustrates the definition of the effective diameter (d) for evaporation compartments of different geometry.
Figure 5:
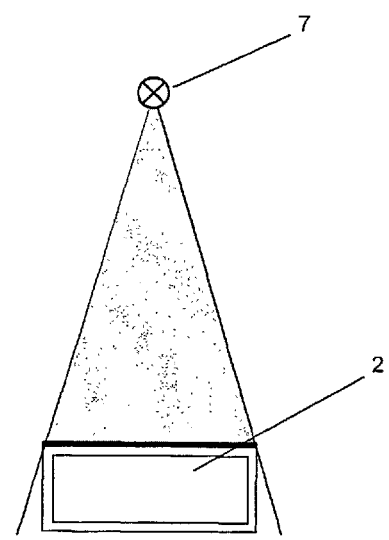
Figure 5:
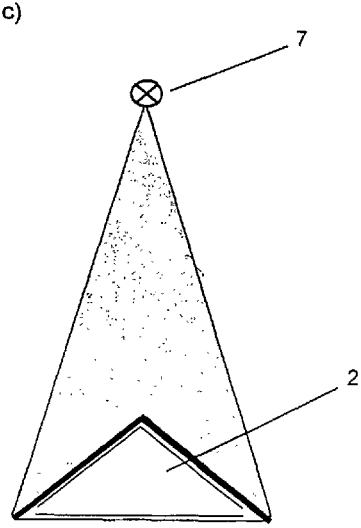
Figure 5:
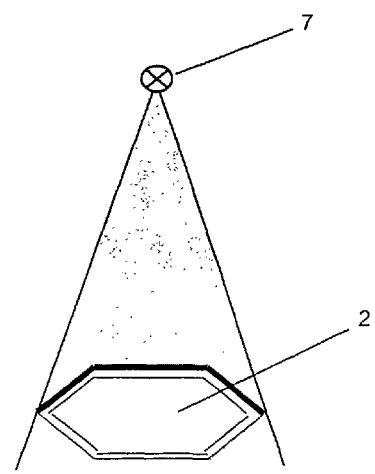

The shape of the evaporation compartment preferably is chosen such that it has a high surface area, such as a tubular- or star-shaped evaporation compartment, with the former being preferred. The membrane of such a tubular-shaped evaporation compartment can, e.g., be prepared by blow molding. Blow molding generally has a beneficial effect on the mechanical stability of the resulting blow molded membrane of the evaporation compartment. Preferably, the evaporation compartment consists essentially of a single polymer material. This makes the design of the evaporation compartment particularly robust and simple. Other major advantages of the evaporation compartment according to the invention are the high purification or desalination yields that can be obtained, and the ease of scaling-up because the evaporation compartment can be made practically endless, and at least as long as necessary. Various forms of evaporation compartments are shown in FIGS. 1, 2a, and 5.

Preferably, the outer surface of the evaporation compartment (2) and the surface of the supporting material are separated by a distance (h). This can be ensured by a spacer, which is preferably selected from, e.g., Enkamat™. The spacer preferably is water permeable.

Generally, the device of the present invention can comprise one or more evaporation compartments, with one being preferred in order to maximize the amount of solar radiation on the evaporation compartment and to reduce the complexity of the device.

The length (L) of the device (see FIG. 3) preferably is in the range of several meters to hundreds of meters.

Figure 2C:
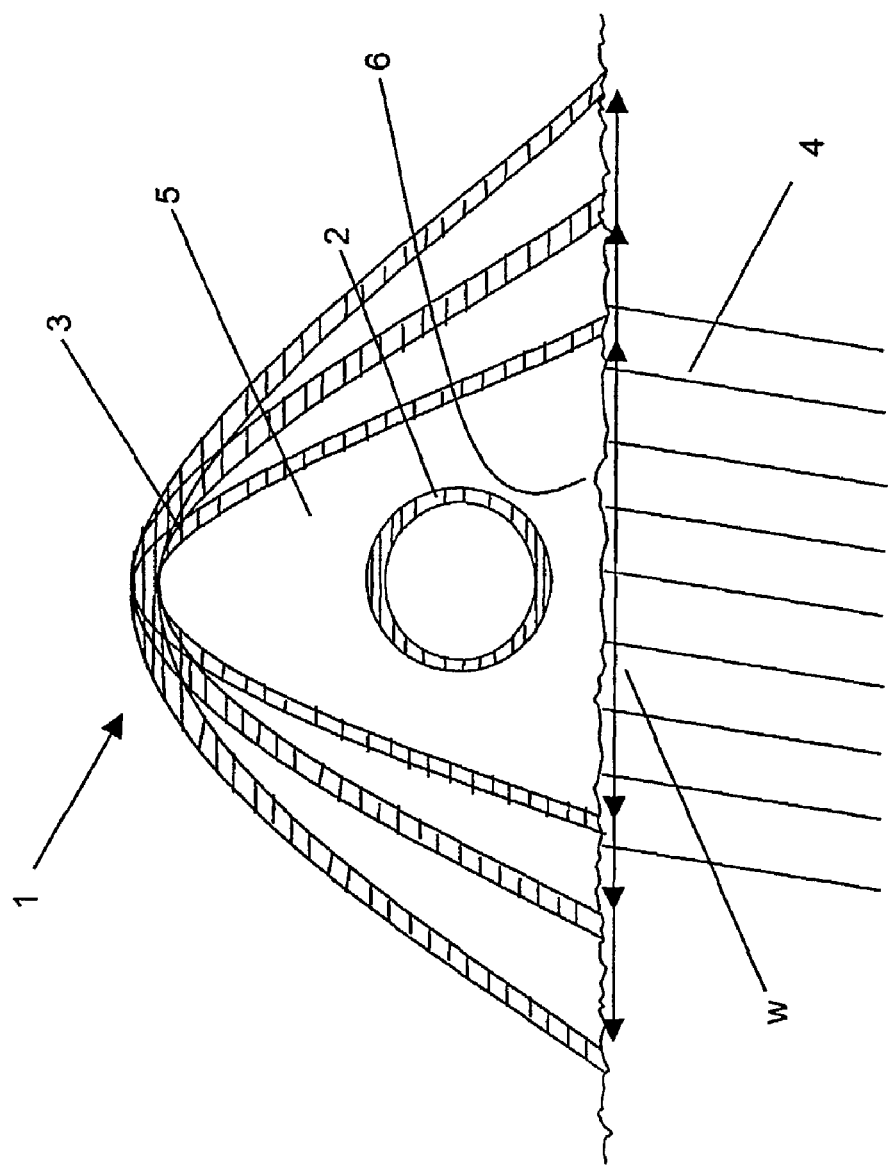
FIG. 2c shows the device of FIG. 1 with different active widths (w).
Figure 3:
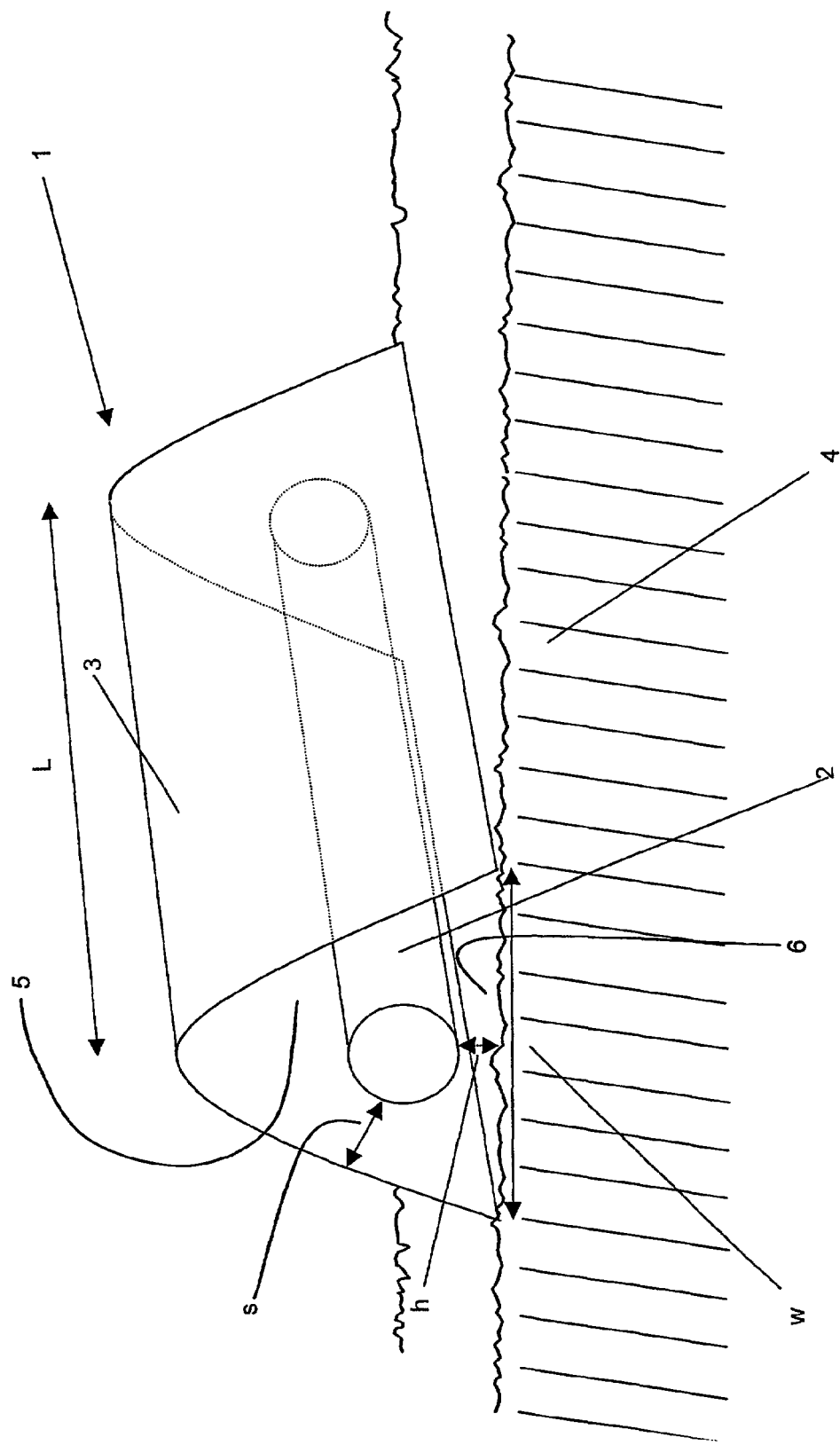
FIG. 3 shows a three-dimensional view of the device of FIG. 1.

A preferred embodiment of the present invention is shown in FIG. 1 (cross-section) and 3 (three-dimensional view). The device (1) of these Figures comprises a vapor chamber (5) formed by an insulation skirt (3) having the form of an arch and comprising two sheets defining a gap with an average width (g). The insulation skirt (3) is connected with its two longer edges to the supporting material (4), thus defining the active width (w) of the lower surface of the vapor chamber (6). The evaporation compartment (2) has a tubular form and is located inside the vapor chamber (5), thus defining a gap between its outer surface and the inner surface of the insulation skirt having an average shortest width (s). The lower surface of the vapor chamber (6) is formed by the top surface of the supporting material (4), and the evaporation compartment (2) is separated from the top surface of the supporting material (4) by a distance (h). The device (1) has a length (L) as shown in FIG. 3. FIG. 2c shows cross-sections of a device such as that of FIG. 1 with different active widths (w).

The cross-section of another preferred embodiment is shown in FIG. 2a. The device (1) of this Figure is similar to that of FIGS. 1 and 3, except that the cross-section of the evaporation compartment (2) has the form of a triangle.

Figure 2B:
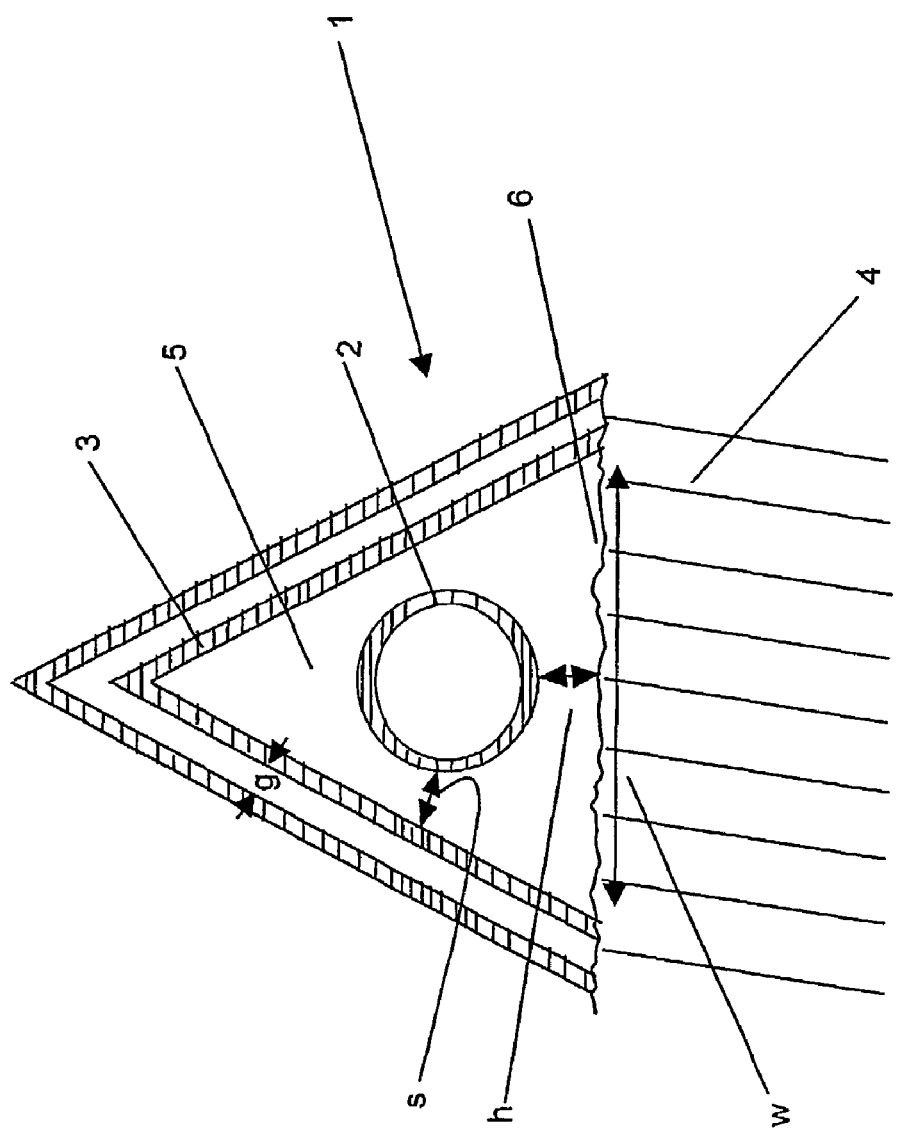

Still another preferred embodiment is shown in FIG. 2b. This device (1) is similar to that of FIGS. 1 and 3, except that the insulation skirt (3) has the form of a triangle. Such insulation skirt geometry typically is realized when glass plates are used to form the insulation skirt.

If so desired, the supporting material (4) can comprise a drainage system which allows the collection of condensed water.

The evaporation compartment can be filled with the aqueous liquid by means of, e.g., a pump which pumps the aqueous liquid, e.g., out of a waste-containing aqueous liquid reservoir into the evaporation compartment. Another possibility is to connect the evaporation compartment to a waste-containing aqueous liquid reservoir situated above the level of the evaporation compartment, so that aqueous liquid will enter the evaporation compartment through gravity. For reasons of simplicity these means for filling the aqueous liquid into the evaporation compartment are not shown in the above Figures.

Figure 7:
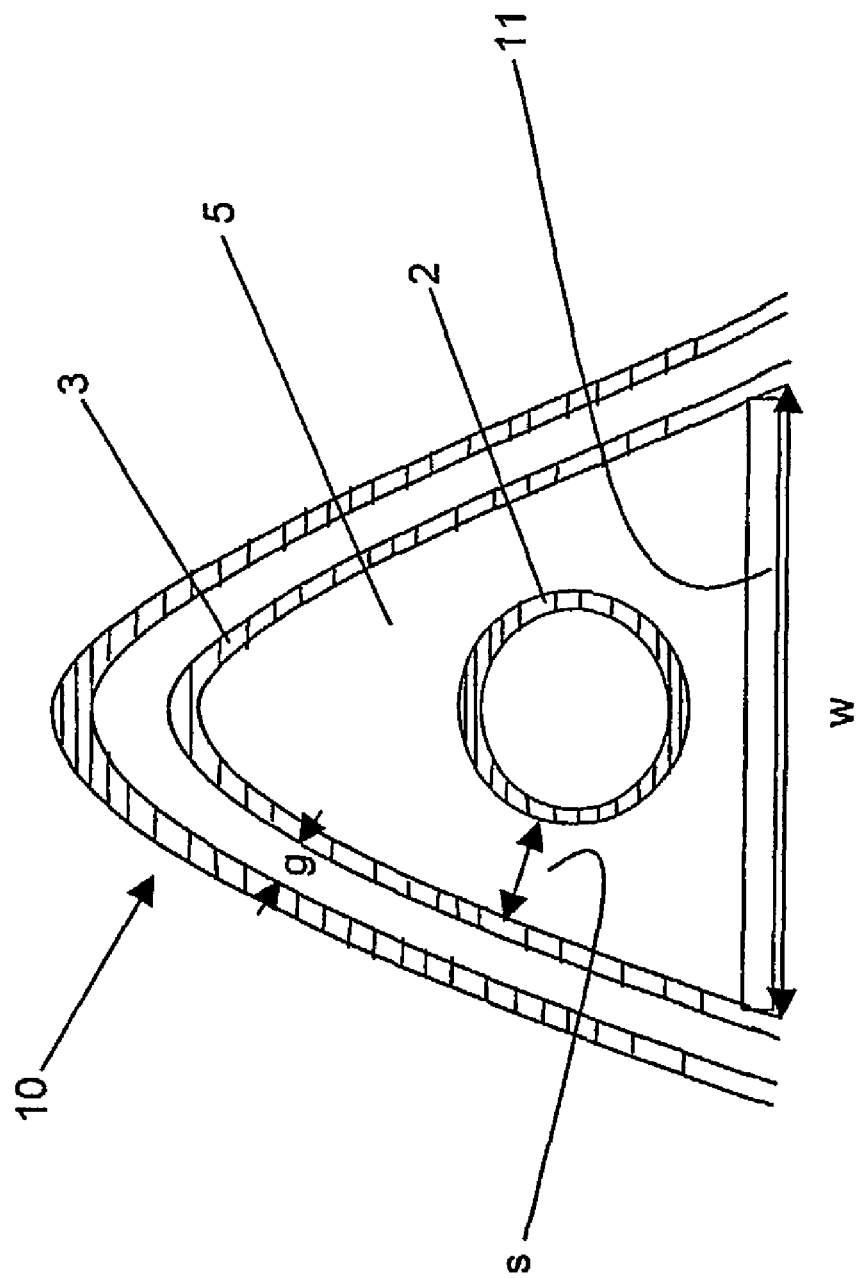
FIG. 7 shows device (10) of the present invention.

An example of a device (10) is shown in FIG. 7. In this figure the same reference signs are used as in FIG. 1, indicating that the definitions and (preferred) embodiments described above for device (1) also hold for device (10) of the present invention.

The whole device of the present invention preferably consists exclusively of polymeric materials. The design of the device of the present invention can thus be extremely simple. Part of it can, however, be made of glass.

The invention further pertains to a process for enabling the evaporation and the condensation of water from an aqueous liquid by means of a temperature gradient, which process comprises (a) filling an evaporation compartment with the aqueous liquid, the evaporation compartment being made from a hollow evaporation compartment (2) having at least a wall with an outer surface and comprising a closed hollow water permeable membrane, (b) transporting the water through the membrane into a vapor chamber (5), which is brought in contact with a condensation compartment (4) that has a lower temperature than that of the evaporation compartment to obtain a temperature gradient, and wherein at least part of the water vapor from the aqueous liquid condenses, and wherein the evaporation compartment is located inside the vapor chamber, and (c) optionally, letting out the residue of the aqueous liquid that is obtained after evaporation of the water and transport of the water vapor from the evaporation compartment to the vapor chamber and the condensation compartment.

Use of the Present Invention

The device of the present invention can, e.g., be used for the irrigation of plants growing on a plant supporting material. In this case the plants preferably grow in close vicinity to the device, so that their roots can reach the condensed water in the plant supporting material. It might also be advisable to cover the top surface of the plant supporting material outside the device with a sheet comprising an aqueous liquid impermeable as well as water vapor impermeable material which sheet contains openings for the plants. In this way the trans-evaporation of condensed water out of the supporting material can be avoided or at least reduced. Other uses are desalting of water, purification of contaminated water, or dewatering of water-contaminated liquids or slurries.

The heat source is preferably sunlight, but other sources such as heated gas, or heat withdrawn from the soil or water can equally well be used. There can also be made use of heat-exchange, for instance by using the residue of the aqueous liquid for heating the aqueous liquid before it enters the evaporation compartment of the device. Also condensation heat can be used for that purpose.

To improve the efficiency of heat the vapor chamber may contain reflectors that are directed to the evaporation compartment. Such reflectors are preferably made of gas permeable film. In another embodiment the heat uptake of the evaporation compartment is improved by armament of the evaporation compartment, for instance with a (preferably black) sleeve or tubing, preferably provided with hairs that are in contact with the homogeneous hydrophilic membrane, so forming a hairy fleece around the evaporation compartment. Suitable fleece materials are, for instance, made of nylon and polypropylene.

Due to the high evaporation and condensation efficiency, the amount of the condensed water can be chosen to be so high that it can be drained out of the supporting material with a drainage system. In this case the device can further be used either for salt leaching or for the collection of fresh water. Salt leaching is suitable in particular in cases where the device is to be run on a supporting material containing high amounts of salts, which is often the case in (semi)arid areas. In this case, the condensed water flows through the supporting material and dissolves any salts contained therein. The salt-containing condensed water is then collected via the drainage system and the salts contained in the supporting material are thus effectively removed. The so desalted supporting material can then be used for agriculture. Optionally, the salt-containing runoff can be used as a feed for the device of the present invention.

On the other hand, if the supporting material contains little or no water-soluble compounds, the condensed water collected via the drainage system can be used as fresh water.

In both cases the top surface of the supporting material outside the device preferably is covered by an aqueous liquid impermeable as well as water vapor impermeable sheet in order to avoid or at least reduce the re-evaporation of condensed water in the supporting material.

In all the above cases the evaporation compartment is at least partially filled with an aqueous liquid. This aqueous liquid may be selected from any waste-containing water such as brackish water, sewer water, water contaminated with heavy metals, such as water contaminated with cadmium, water otherwise contaminated, such as water contaminated with arsenic, sea water, a mixture of water and organic compounds, such as water contaminated with crude oil residues such as, e.g., obtained as a side product in oil and gas production (formation water) or the above-described salt-containing drainage water. Typically, the aqueous liquid contains one or more of the following components: sodium, calcium, magnesium, sulfate, chloride, hydrogen carbonate, or carbonate ions. Preferably, the aqueous liquid comprises sodium chloride and more preferably is sea water or brackish water. Preferably, the aqueous liquid is chosen such that is has little or no (bio)fouling and/or scaling ability, the lack thereof which is one of the advantage of the present invention. If necessary, the aqueous liquid can be filtered before use in order to reduce its fouling and/or scaling ability. This may in particular be the case with sea water.

During or before use of the device of the present invention, the aqueous liquid which is contained in the evaporation compartment is heated to ensure evaporation of water. In a preferred embodiment the aqueous liquid is heated by the sun.

Alternatively or additionally, it is also possible to preheat the aqueous liquid before it enters the evaporation compartment. This preheating can be instead of the heating of the aqueous liquid in the evaporation compartment by the sun or in addition to it.

The aqueous liquid can be pumped through the evaporation compartment. However, it is also possible to connect the evaporation compartment to a storage tank containing the aqueous liquid. In this case any water evaporating through the water permeable membrane of the evaporation compartment is replaced by aqueous liquid from the storage tank.

If the evaporation compartment is fed with waste water, any of the above uses will result in concentrating the waste water. Therefore, it is a further aspect of the present invention to use the device of the present invention for the concentrating waste water.

Various variants of the device of the invention can be envisaged. In an embodiment of this invention the device can be mounted in the air by means for suspending, and the water vapor can be led through a pipe to the soil (condensation compartment).

In a particularly preferred embodiment the evaporation compartment is separated from the condensation compartment by means of a spacer. This is useful when the condensation compartment is the ground to prevent direct contact of the evaporation compartment with the ground.

When the device of the invention is mounted in the vicinity of transparent walls of greenhouses the heat absorption of the device leads to cooling of the greenhouse, which is an additional advantage in the temperature control thereof.

The invention will be further illustrated by way of the following examples:

EXAMPLE 1

This example illustrates the operation of a device as depicted in FIGS. 1 and 3. The device comprised
1) an evaporation compartment,
2) a storage tank which was located above the level of the evaporation compartment and connected to the evaporation compartment,
3) a vapor chamber the upper surface of which is formed by an insulation skirt and the lower surface of which is sand.

The active width (w) and the effective diameter (d) of the device were both chosen to be 9 cm, i.e., the active width was 100% of the effective diameter.

The evaporation compartment had a tubular shape as shown in FIGS. 1 and 3 and the walls of this compartment were made of a copolyetheramide membrane as described in non-prepublished international patent application PCT/EP99/08159. The membrane had a thickness of 0.050 mm and a water vapor permeability of 2500-2700/(24 h*m$^2$), measured for a membrane with a thickness of 15 μm in accordance with ASTM E96-66 (Method B, modified (water temperature: 30° C., ambient temperature: 21° C. at 60% relative humidity)). The membrane was produced as a blow molded endless tube. The tubular membrane was reinforced on its outer surface with a highly porous black non-woven material composed of polyester (Colback™; ex Akzo Nobel/Acordis).

The insulation skirt had the form of an arch as shown in FIGS. 1 and 3 and was composed of two polyethylene blister paddings creating a gap (g) between the outer and the inner blister padding with an average width of about 3 mm. The outer surface of the inner blister padding functioned as the inner surface of the insulation skirt. The nodes on the inner surface of this inner blister padding functioned as a spacer between this inner surface of the insulation and the evaporation compartment, thus defining a gap with an average shortest width(s) of about 3 mm.

The total height of the device (measured from the surface of the supporting material to the top point of the outer surface of the insulation skirt) was about 7 cm and the length (L) was one meter.

During the test the evaporation compartment was filled with salty water comprising 10 g sodium chloride per kg water. To check whether any leakage of salty water occurred during the experiment, the storage tank was filled with distilled water. If salty water leaks out of the evaporation compartment, this will result in a decrease of the salt concentration in the evaporation compartment, as the leaked salty water is replaced by distilled water from the storage tank. On the other hand, if there is no leakage of salty water out the evaporation compartment, the salt concentration in the evaporation compartment will remain the same during the entire experiment, as any water evaporating from the evaporation compartment (and not containing any salts) is replaced by distilled water.

Subsequently, the device was exposed (i) to "synthetic" sunlight created in a laboratory with an output of 12 kWh/m$^2$.day and (ii) natural sunlight with an output of 3.6 kWh/m$^2$.day. In experiment (i) the day-night sequence was imitated by irradiating the device during 12 hours followed by 12 hours of darkness. In both cases, the experiment was run over a time period of one week. After the experiment, the salt concentration in the evaporation compartment was measured to be identical to the salt concentration before the start of the experiment. Consequently, no salty water had leaked out of the evaporation compartment during the experiment.

As described above, during the above experiment any water evaporating out of the evaporation compartment and thus resulting in condensed fresh water was replaced by distilled water from the storage tank. Consequently, the amount of fresh water per time period can be expressed as the difference between the amount of distilled water in the storage tank at the beginning of this time period and the amount of distilled water in the storage tank at the end of this time period. In this way it could be calculated that in experiment (i), 1 kg of fresh water was produced per 24 hours and in experiment (ii), 0.4 kg fresh water was produced per 24 hours.

Characterization Methods/Definitions

Definition of the Active Width (w) of Device (1) and of Device (10)

Figure 4:
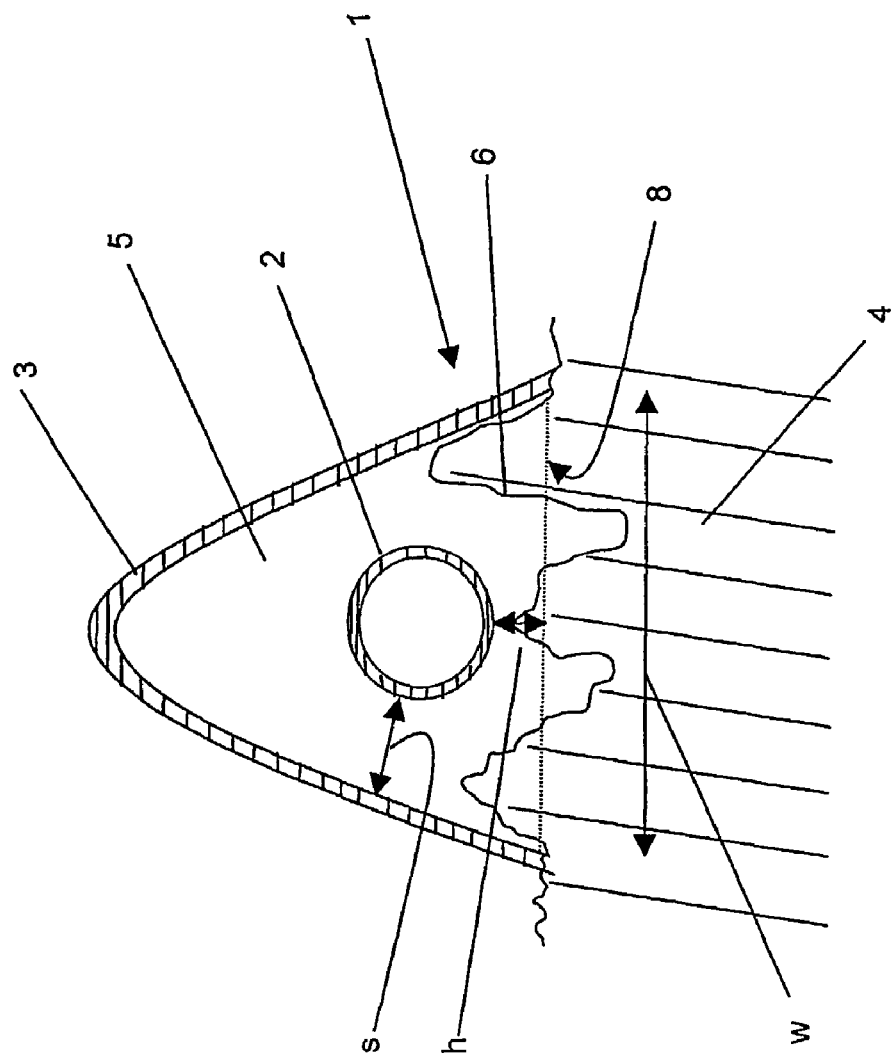
FIG. 4 illustrates the definition of the active width (w) and of the distance (h).

The active width (w) of the lower surface of the vapor chamber of device (1) is the distance between the two points in the cross-section of the device where the inner surface of the insulation skirt meets the supporting material (see, e.g., FIG. 4). If the active width varies over the length (L) of the device (1), the active width (w) in the sense of the present invention is the average of these active widths. For device (10), the active width (w) is the width of the cross-section of the liquid permeable material to be provided on the surface of the supporting material. The active width of the device (10) is thus identical to the active width of device (1). Therefore, the same reference sign "(w)" has been used for both device (1) and device (10) of the present invention.

Definition of the Effective Diameter (d):

The effective diameter is the longest dimension of the cross-section of the evaporation compartment which can be covered at once when exposed to the sun (or other heat source) (i.e. the longest dimension of the cross-section of the non-shadow portion). This is illustrated in FIG. 5. A light source (7) (representative of the sun) is located above evaporation compartments (2) of different geometries. The parts of the evaporation compartments in their cross-sections which are covered most by the light source are indicated by bold lines. The effective diameter (d) is the length of these lines. E.g., for a tubular evaporation compartment (FIG. 5a) with radius r, the effective diameter is πr.

If the effective diameter varies over the length of the evaporation compartment, the effective diameter (d) in the sense of the present invention is the average of these effective diameters.

Definition of the Distance (h) of Device (1) of the Present Invention:

The distance (h) of device (1) is the shortest distance between the outer surface of the evaporation compartment and the average level (8) of the surface of the supporting material. For a non-level surface the definition of (h) is illustrated in FIG. 4.

The invention claimed is:

1. A device suitable for use in an installation for the evaporation and the condensation of water from an aqueous liquid by means of a temperature gradient, which device comprises:
   (a) a vapor chamber that can be brought in contact through an open or a water-permeable lower surface with
   (b) a condensation compartment wherein at least part of the water vapor from the aqueous liquid condenses, and
   (c) an evaporation compartment located inside of said vapor chamber comprising a closed, hollow and liquid water impermeable and water vapor permeable membrane, and wherein the vapor chamber has an outer surface that comprises a substantially water-impermeable insulation skirt and the outer surface of the evaporation compartment which has an average shortest width (s) of at least 0.1 cm., so that the inner surface of the insulation skirt does not or predominantly does not touch the outer surface of the evaporation compartment, and wherein the vapor chamber has a lower surface of an active width (w) which is at least 10% of the effective diameter (d) of the evaporation compartment, wherein the lower surface is defined as the part of the vapor chamber that is in liquid and vapor flow with the condensation compartment.

2. The device of claim 1 wherein at least a part of a surface of the vapor chamber is formed by the condensation compartment and/or is formed by a material which stands in both liquid flow and vapor flow communication with said condensation compartment.

3. The device of claim 1 wherein the active width (w) is at least 30% of the effective diameter (d) of the evaporation compartment.

4. The device of claim 1 wherein the membrane is a salt resistant membrane.

5. The device of claim 1 wherein the membrane is a seamlessly closed hollow membrane.

6. The device of claim 1 wherein the evaporation compartment comprises of a hydrophilic and non-porous homogeneous membrane.

7. The device of claim 1 wherein at least part of the insulation skirt is made of a polymer, metal, ceramic material, or glass.

8. The device of claim 1 wherein the condensation compartment is natural or artificial soil, optionally contained in a vessel, container or basin.

9. The device of claim 8 wherein the artificial soil is selected from the group consisting of substrate materials known from soilless culture, hydroponics and hydrophilic porous materials.

10. The device of claim 8 wherein the natural or artificial soil contains a drainage system which enables the collection of condensed water.

11. The device of claim 1 having means for filling the evaporation compartment with the aqueous liquid, and optionally, means for letting out the residue of the aqueous liquid that is obtained after evaporation of the water and transport of the water vapor from the evaporation compartment to the vapor chamber and the condensation compartment.

12. The device of claim 1 wherein the vapor chamber comprises means for obtaining a convection stream to enhance the evaporation from the evaporation compartment and/or the transport of the water vapor from the vapor chamber to the condensation compartment.

13. The device of claim 1 wherein said membrane comprises a salt resistant and water permeable homogeneous non-porous hydrophilic membrane of a copolyether amide obtainable from the polymerization of a lactam monomer having 3 to 12 carbon atoms, a dicarboxylic acid with 2 to 20 carbon atoms, and a diamine of the formula $H_2N-(CRH)_y-(OQ)_x-NH_2$, wherein R is independently H or $CH_3$, x is an integer from 1 to 100, y is an integer from 1 to 20, Q is $R^2-R^1$ wherein $R^2$ a C2-C4 alkylene group substituted by $R^1$, which is hydrogen or a C1-C4 alkyl group.

14. The device of claim 1 wherein said membrane comprises a copolyether amide obtainable from the polymerization from the group consisting of a lactam monomer having 3 to 12 carbon atoms, a dicarboxylic acid with 2 to 20 carbon atoms, and a diamine of the formula $H_2N-(CRH)_y-(OQ)_x-NH_2$, wherein R is independently H or $CH_3$, x is an integer from 1 to 100, y is an integer from 1 to 20, Q is $R^2-R^1$ wherein $R^2$ a C2-C4 alkylene group substituted by $R^1$.

15. The device of claim 1 wherein the evaporation compartment comprises a hydrophilic and non-porous homogeneous membrane selected from the group consisting of a copolyetherurethane, a copolyetherester, and a copolyetheramide.

16. The device of claim 1 wherein said evaporation compartment is seamlessly closed.

17. A device suitable for use in an installation for the evaporation and the condensation of water from an aqueous liquid by means of a temperature gradient, which device comprises
   (a) a vapor chamber that can be brought in contact through an open or a water-permeable lower surface with
   (b) a condensation compartment wherein at least part of the water vapor from the aqueous liquid condenses, and
   (c) an evaporation compartment located inside of said vapor chamber comprising a closed, hollow and liquid water impermeable and water vapor permeable membrane, and wherein the vapor chamber has an outer surface that comprises a substantially water-impermeable insulation skirt with an inner and an outer surface, such that there is a gap between the inner surface of the insulation skirt and the outer surface of the evaporation compartment so that the inner surface of the insulation skirt does not or predominantly does not touch the outer surface of the evaporation compartment, the insulation skirt comprises at least two aqueous liquid and water vapor impermeable sheets with a gap between these sheets having an average width (g) of at least 0.1 cm., and wherein the vapor chamber has a lower surface of an active width (w) which is at least 10% of the effective diameter (d) of the evaporation compartment, wherein the lower surface is defined as the part of the vapor chamber that is in liquid and vapor flow with the condensation compartment.

18. A process for the condensation of water from an aqueous liquid by means of a temperature gradient, which process comprises:
   (a) filling an evaporation compartment of a device suitable for use in an installation for the condensation of water with the aqueous liquid,
   (b) transporting the water through a closed, hollow, liquid water impermeable and water vapor permeable membrane of the evaporation compartment into a vapor chamber of the device, which includes:
      a substantially water-impermeable insulation skirt that does not touch or predominantly does not touch the evaporation compartment, and
      a water permeable lower surface with an active width of at least about 10% of an effective diameter of the evaporation component,
      the water permeable lower surface in contact with a condensation compartment of the device that has a lower temperature than that of the evaporation compartment to obtain a temperature gradient, and wherein at least part of the water vapor from the water condenses, and
   (c) optionally, letting out the residue of the aqueous liquid that is obtained after evaporation of the water and transport of the water vapor from the evaporation compartment to the vapor chamber and the condensation compartment.

19. A process for the condensation of water from an aqueous liquid by means of a temperature gradient, which process comprises
   (a) filling an evaporation compartment of a device suitable for use in an installation for the condensation of water with the aqueous liquid,
   (b) transporting the water through a closed, hollow, liquid water impermeable and water vapor permeable membrane of the evaporation compartment into a vapor chamber of the device, which includes:
      a substantially water-impermeable insulation skirt that includes at least two sheets spaced an average shortest distance of about 0.1 cm apart from each other and that does not touch or predominantly does not touch the evaporation compartment, and
      a water permeable lower surface with an active width of at least about 10% of an effective diameter of the evaporation component,
      the water permeable lower surface in contact with a condensation compartment of the device that has a lower temperature than that of the evaporation compartment to obtain a temperature gradient, and wherein at least part of the water vapor from the aqueous liquid condenses, and
   (c) optionally, letting out the residue of the aqueous liquid that is obtained after evaporation of the water and transport of the water vapor from the evaporation compartment to the vapor chamber and the condensation compartment.

* * * * *